(12) United States Patent
Tanaka et al.

(10) Patent No.: US 7,251,111 B2
(45) Date of Patent: Jul. 31, 2007

(54) METHOD OF CONTROLLING SEATBELT RETRACTING DEVICE WITH MOTOR

(75) Inventors: Koji Tanaka, Moriyama (JP); Koji Inuzuka, Shiga-ken (JP)

(73) Assignee: Takata Corporation, Tokyo (JP)

( * ) Notice: Subject to any disclaimer, the term of this patent is extended or adjusted under 35 U.S.C. 154(b) by 553 days.

(21) Appl. No.: 10/868,932

(22) Filed: Jun. 17, 2004

(65) Prior Publication Data

US 2005/0077412 A1 Apr. 14, 2005

(30) Foreign Application Priority Data

Sep. 25, 2003 (JP) ............................. 2003-332854

(51) Int. Cl.
*H02H 7/08* (2006.01)

(52) U.S. Cl. ..................... 361/31; 280/807; 280/801.1; 242/420.05; 318/254

(58) Field of Classification Search .................. 361/31; 242/390, 420.05; 318/254; 280/807, 801.1
See application file for complete search history.

(56) References Cited

U.S. PATENT DOCUMENTS

| 6,485,057 | B1 * | 11/2002 | Midorikawa et al. ....... 280/807 |
| 6,494,395 | B1 | 12/2002 | Fujii et al. |
| 2004/0108697 | A1 | 6/2004 | Midorikawa et al. |

FOREIGN PATENT DOCUMENTS

EP 1 293 401 3/2003

* cited by examiner

*Primary Examiner*—Rita Leykin
(74) *Attorney, Agent, or Firm*—Manabu Kanesaka

(57) ABSTRACT

In controlling a seatbelt retracting device having a mechanism for retracting a seatbelt with a motor, a current flowing to the motor is detected, and a rate of increase in the current is calculated. When the rate of increase exceeds a predetermined value, the motor is stopped. When the current exceeds a predetermined value, the motor is stopped as well.

5 Claims, 4 Drawing Sheets

METHOD OF CONTROLLING SEATBELT RETRACTING DEVICE WITH MOTOR

BACKGROUND OF THE INVENTION AND RELATED ART STATEMENT

The present invention relates to a method of controlling a seatbelt retracting device having a mechanism for retracting a seatbelt with a motor.

A seatbelt retracting device mounted to a motor vehicle or the like has a function of winding an excess portion of a seatbelt after an occupant withdraws the seat belt and attaches a tongue to a buckle device. A conventional seatbelt retracting device is provided with a single return spring for performing such a function. Accordingly, when an occupant withdraws a seatbelt against an urging force of the return spring to fasten the seatbelt, and releases a hand after attaching the tongue to the buckle, the seatbelt retracting device winds an excess portion of the seatbelt with a force of the return spring so that the seatbelt fits the occupant.

As described above, the seatbelt retracting device has the function of winding an excess portion of the seatbelt so that the seatbelt fits the occupant. When the seatbelt is not used, the seatbelt retracting device winds the seatbelt until the seatbelt is completely stored in a storage unit. At the same time, when the seatbelt is used normally, the seatbelt retracting device needs to prevent an unnecessary pressure on the occupant. However, in the seatbelt retracting device having the single return spring, when an urging force of the spring is reduced to alleviate the pressure on the occupant, the urging force may not be enough to smoothly retract the seatbelt (for storing), thereby suffering operability and storability. In contrast, when the urging force is increased to provide a sufficient retracting force for the retraction, an unpleasant pressure may be applied to the occupant.

Further, in the conventional seatbelt retracting device provided with a single return spring, the return spring is wound as the seatbelt is withdrawn, thereby increasing the urging force as the withdrawn amount of the seatbelt increases.

In order to solve the problems described above, there has been a seatbelt retracting device, in which a motor or a combination of a motor and a return spring winds a seatbelt, as disclosed in Japanese Patent Publication (Kokai) No. 2001-225720. Such a seatbelt retracting device having a motor for retracting a seatbelt has been also disclosed in Japanese Patent Publications (Kokai) No. 11-301407 and No. 11-334533.

In general, a seatbelt retracting device with a motor is controlled to shut off power to the motor when a seatbelt is completely retracted. If the power to the motor is left on when the seatbelt is completely retracted, power source of a battery is wasted. Further, the motor may be overheated, thereby making it necessary to use a motor with high heat resistance. Accordingly, in the conventional control system, a current flowing to the motor is monitored. When the current exceeds a predetermined value, it is determined that the seatbelt is completely retracted, and the power to the motor is shut off.

In the conventional control system, it is determined that the seatbelt is completely retracted when a relatively large current is detected, so that it is possible to securely retract the seatbelt. However, in a case that a part of an occupant, e.g. an arm, is caught in the seatbelt during retraction, a retraction force of the motor tightens the part of the occupant, thereby imposing a pressure on the occupant. If the occupant tries to withdraw the seatbelt during the retraction, it is necessary to withdraw the seatbelt with a strong force against the retracting force of the motor.

The seatbelt retracting device may be deteriorated with time, and it is necessary to increase a torque for winding the seatbelt, or an output of the motor is lowered. In such a case, if it is set to determine that the seatbelt is completely retracted at a relatively small current, it may be determined that the seatbelt is completely retracted before the seatbelt is actually retracted completely, and the power to the motor is shut off, resulting in insufficient retraction.

In view of the problems described above, an object of the present invention is to provide a method of controlling a seatbelt retracting device with a motor in which it is possible to securely retract a seatbelt in a normal state. Further, it is possible to prevent a pressure on an occupant when a part of the occupant is caught in the seatbelt, and to withdrawn the seatbelt with a small force during retraction.

Further objects and advantages of the invention will be apparent from the following description of the invention.

SUMMARY OF THE INVENTION

In order to attain the objects described above, according to a first aspect of the invention, a method of controlling a seatbelt retracting device with a mechanism for retracting a seatbelt with a motor includes stopping the motor when a rate of increase in a current flowing to the motor exceeds a predetermined value.

In the first aspect of the present invention, the motor is stopped when the rate of increase in the current flowing to the motor exceeds the predetermined value. In a normal case, when the seatbelt is completely retracted, a load of the motor abruptly increases and the current abruptly increases. The motor is stopped when the rate of increase in the current exceeds a threshold, so that an excessive current does not flow to the motor after completion of the retraction. In a case that a part (for example, an arm) of the occupant is caught in the seatbelt, and the occupant withdraws the seatbelt during the retraction, the current to the motor abruptly increases in an initial stage. As a result, the rate of increase in the current exceeds the predetermined threshold, and the power to the motor is stopped. Accordingly, it is possible to prevent pressure applied to the occupant and withdraw the seatbelt with a small force.

According to a second aspect of the present invention, in the first aspect, the motor is stopped also when a current flowing to the motor exceeds a predetermined value.

In the first aspect, if the seatbelt retracting device by itself is deteriorated and hence a large current is required for retraction, there may be a case in which even when the current to the motor reaches a saturation value and retraction is almost completed, the rate of increase in the current to the motor is not large. In the second aspect, the motor is stopped also when the current flowing to the motor exceeds the predetermined value. The predetermined value is set to a value close to the saturation value of the current to the motor. Accordingly, it is possible to stop the power to the motor upon completion of the retraction.

According to a third aspect of the present invention, in the first or the second aspect, the motor is not controlled for a predetermined period from a moment when the motor is activated.

Immediately after the motor is activated, a counter electromotive force of the motor is small, so that an accelerated current flows and the current flowing to the motor abruptly increases. In the first and the second aspects, the rate of the current or the current may exceed the threshold and the motor may stop. In the third aspect, the motor is not controlled for the predetermined period from the moment when the motor is activated. Accordingly, it is possible to prevent malfunction due to the accelerated current immediately after the motor is activated.

As described above, according to the present invention, it is possible to provide the method of controlling the seatbelt retracting device with a motor in which the seatbelt is securely retracted in the normal state. Further, even when a part of the occupant is caught in the seatbelt, it is possible to withdraw the seatbelt with a small force during the retraction without imposing a pressure.

BRIEF DESCRIPTION OF THE DRAWINGS

FIGS. 2(a) and 2(b) are charts showing a current and a rate of increase in the current with time for explaining a controlling method of Mode 1, wherein FIG. 2(a) shows a normal state, and FIG. 2(b) shows a state that a part of an occupant is caught in a seatbelt;

FIGS. 3(a) and 3(b) are charts showing a current and a rate of increase in the current with time for explaining a controlling method of Mode 2, wherein FIG. 3(a) shows a state that a torque required for retracting the seatbelt is increased, and FIG. 3(b) shows a state that a torque required for retracting the seatbelt is further increased.

DETAILED DESCRIPTION OR PREFERRED EMBODIMENTS

Figure 1:
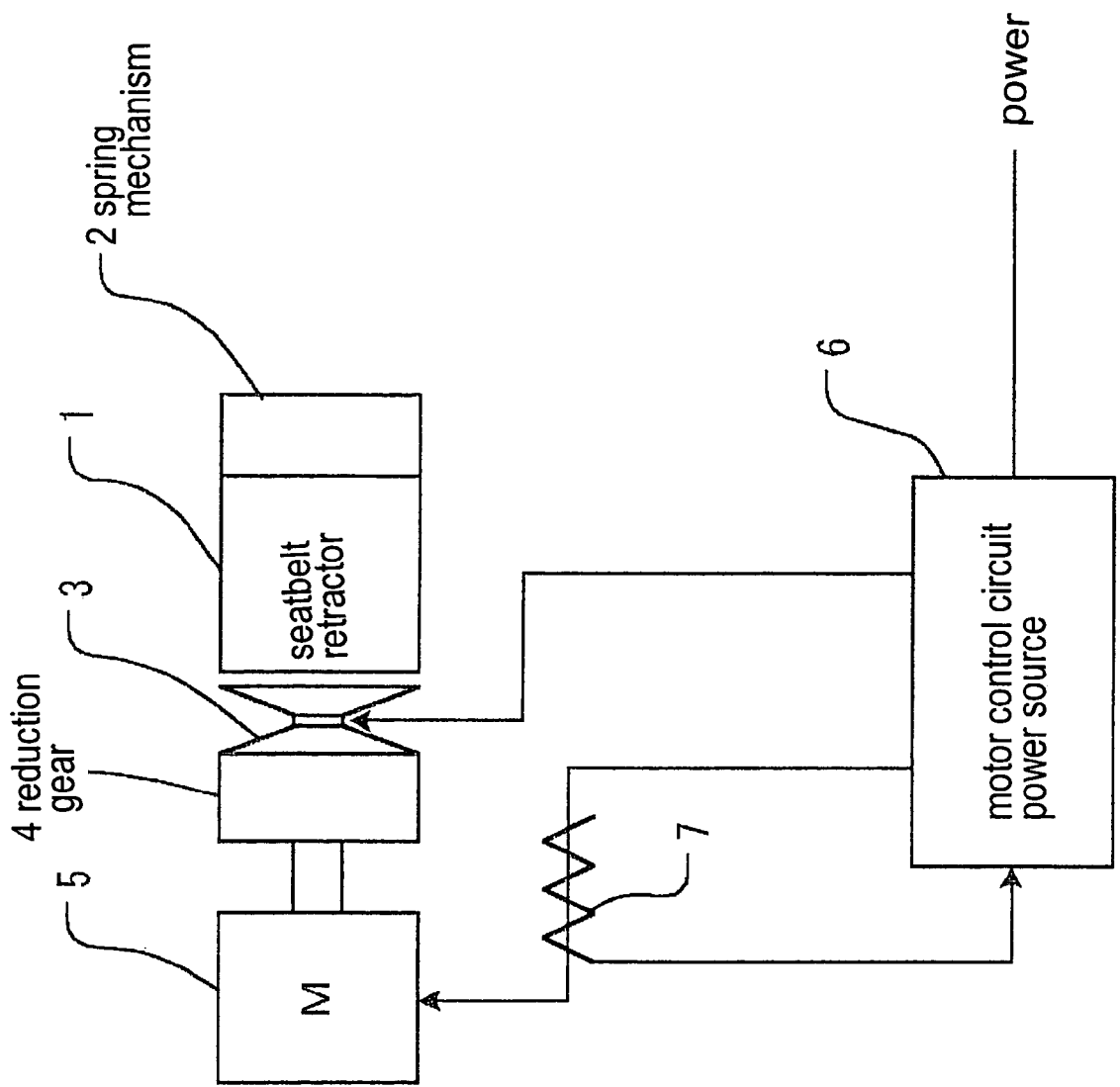
FIG. 1 is a schematic diagram showing a structure of a device to which a controlling method is applied according to an embodiment of the present invention.

Hereunder, embodiments of the present invention will be described with reference to the accompanying drawings. FIG. 1 is a schematic diagram showing a structure of a device to which a method of controlling is applied according to an embodiment of the present invention. In FIG. 1, reference numeral 1 designates a seatbelt retractor (main body of a seatbelt retracting device), reference numeral 2 designates a spring mechanism, reference numeral 3 designates a clutch, reference numeral 4 designates a reduction gear, reference numeral 5 designates a motor, reference numeral 6 designates a motor control circuit, and reference numeral 7 designates a current detecting circuit.

The seatbelt retractor 1 is connected to the spring mechanism 2, and to the reduction gear 4 via the clutch 3. The reduction gear 4 is directly connected to the motor 5. The motor control circuit 6 turns on and off power supplied to the motor 5 and the clutch 3.

When an instruction to drive the seatbelt retractor by the motor 5 is issued to the motor control circuit 6 via an external signal (not shown), the motor control circuit 6 turns on the power to the motor 5 and the clutch 3, so that the seatbelt retractor 1 engages the reduction gear 4.

The current detecting circuit 7 detects a current flowing to the motor 5, and sends a detection signal to the motor control circuit 6. The motor control circuit 6 reads a current value detected by the current detecting circuit 7 at a predetermined time interval, and calculates a difference with respect to a value read previously. The power supplied to the motor 5 is stopped according to a mode selected from three modes described below.

Mode 1

The power distribution to the motor 5 is stopped when the difference or a differential value of the current exceeds a predetermined threshold.

Mode 2

The power distribution to the motor 5 is stopped when the difference or the differential value of the current exceeds the predetermined threshold, or when the current value exceeds a predetermined threshold (different from the threshold of the difference or the differential value).

Mode 3

Control in Mode 1 or Mode 2 is not executed after a predetermined period of time when the power is supplied to the motor 5.

Figure 2A:
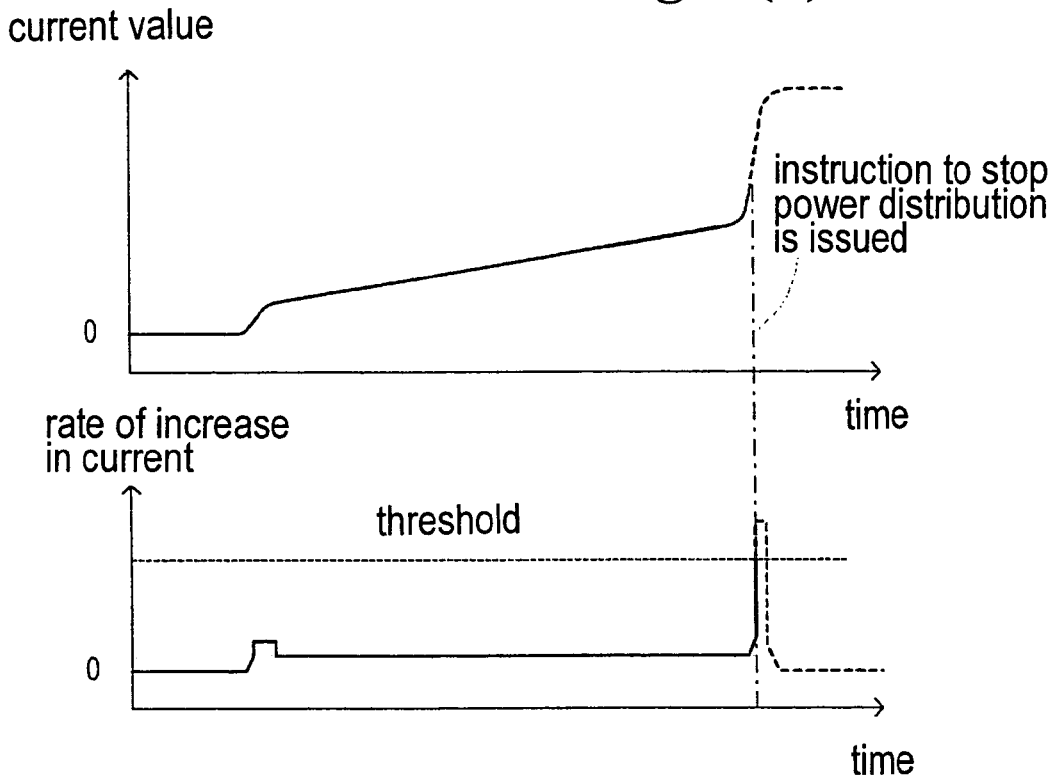
Figure 2B:
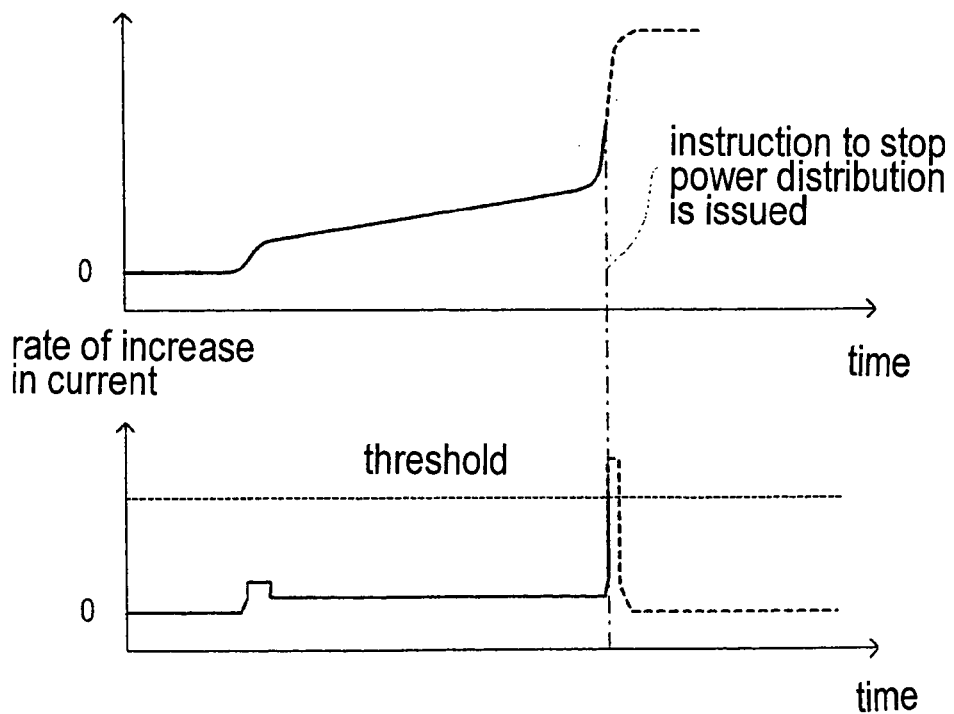

An operation in these control modes will be described in detail below. FIGS. 2(a) and 2(b) are charts showing an operation of the motor control circuit 6 in Mode 1. FIG. 2(a) shows a state that the seatbelt is retracted in a normal way, and FIG. 2(b) shows a state that a part (for example, an arm) of an occupant is caught in the seatbelt during the retraction. Solid lines represent an actual current value and an actual rate of increase in the current, and hidden lines represent a current value and a rate of increase in the current when the power is not stopped.

When the power distribution to the motor 5 is started, the current value abruptly increases initially. Then, the seatbelt is retracted and the current value increases gradually as the load increases. When the seatbelt is completely retracted and not retracted any more, the motor 5 stops and the current increases abruptly. The motor control circuit 6 obtains the rate of increase in the current by differentiating an output of the current detecting circuit 7 or calculating a difference with respect to a previous measured value. The motor control circuit 6 stops the power distribution to the motor 5 when the rate of increase in the current exceeds the predetermined threshold. In this manner, the power distribution to the motor 5 can be stopped when the seatbelt is completely retracted.

As shown in FIG. 2(b), the load of the motor 5 increases when a part (for example, an arm) of the occupant is caught in the seatbelt during the retraction. As a result, the current value abruptly increases and the rate of increase in the current exceeds the threshold. Accordingly, the motor control circuit 6 stops the power distribution to the motor 5. Therefore, the power distribution is stopped at the moment when the motor 5 still generates a small retracting force, thereby preventing pressure applied to the occupant.

Figure 3A:
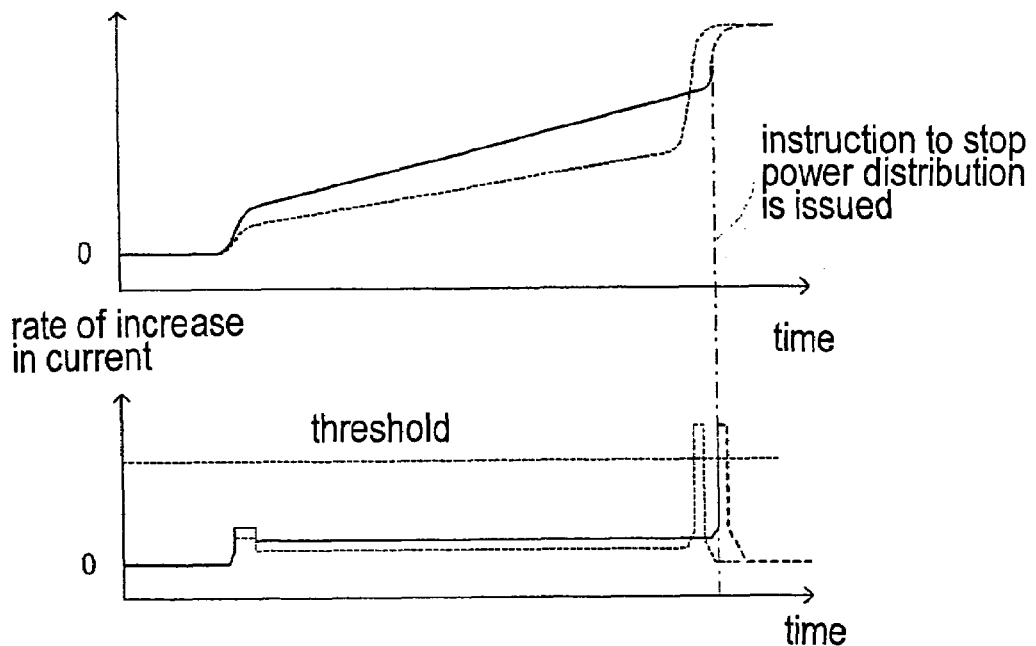
Figure 3B:
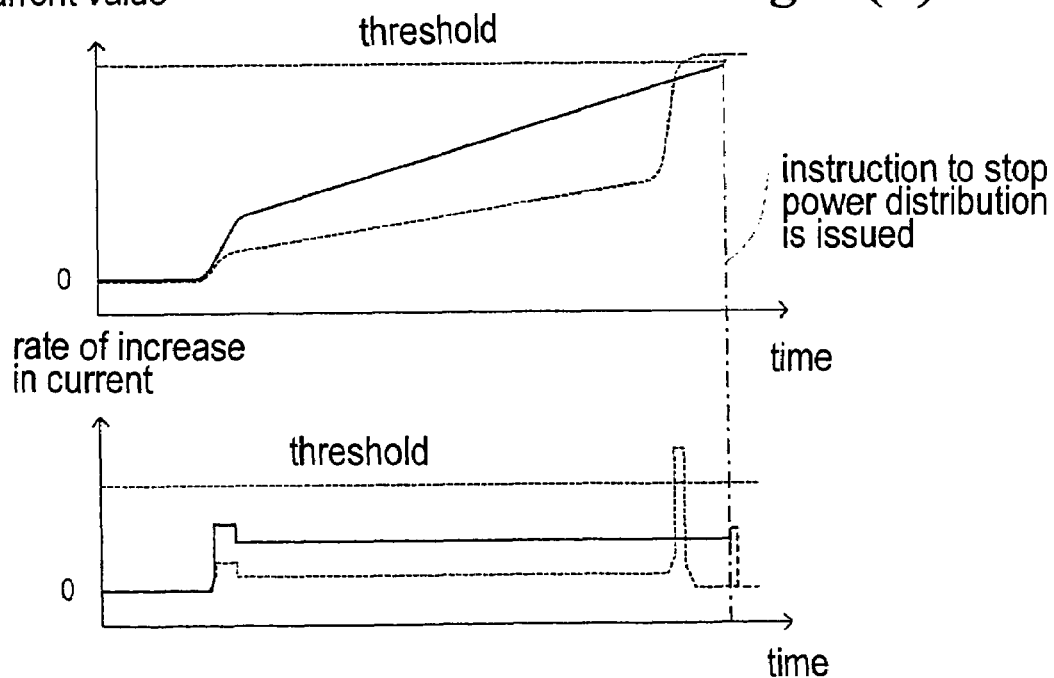

FIGS. 3(a) and 3(b) are charts showing an operation of the motor control circuit 6 when the seatbelt retractor 1 is deteriorated and the torque required for retracting the seatbelt is increased, or when the motor 5 is deteriorated and an output torque is lowered.

FIG. 3(a) shows a state that the torque required for retracting the seatbelt is increased. Solid lines represent the case that the torque required for retracting the seatbelt is increased, and thin hidden lines represent the initial state as shown in FIG. 2(a). Thick hidden lines represent the current value and the rate of increase in the current when the power is not stopped. In such a case, the current value required for retracting the seatbelt increases, and the rate of increase in the current also increases. However, the motor control circuit 6 detects the rate of increase in the current and stops the power distribution to the motor when the detected value exceeds the threshold. Accordingly, the power distribution to the motor is stopped at the moment when the seatbelt is completely retracted as shown in FIG. 3(a).

In contrast, in a conventional device, the power distribution to the motor is stopped when the current value reaches the predetermined threshold. Accordingly, depending on the threshold, the power distribution to the motor may be stopped before the seatbelt is completely retracted when the torque required for retracting the seatbelt increases.

FIG. 3(b) shows a state that the torque required for retracting the seatbelt is further increased. Solid lines represent the case that the torque required for retracting the seatbelt is further increased, and thin hidden line represents the initial state as sown in FIG. 2(a). Thick hidden line represents the current value and the rate of increase in the current when the power distribution is not stopped. In this case, when the seatbelt is completely retracted, the current value almost reaches the saturation value, and the rate of increase in the current does not increase even when the retraction is completed.

Accordingly, in the method shown in FIGS. 2(a) and 2(b) or FIG. 3(a), there is a case in which the power distribution may not be stopped. In such a case, the control method in Mode 2 is used, in which the power distribution to the motor 5 is stopped when the current value exceeds the predetermined threshold and the rate of increase in the current exceeds the predetermined threshold. The threshold of the current value is preferably slightly smaller than the saturation value of the current. In other words, Mode 2 is preferably applied to a secondary control in which the power distribution to the motor 5 is stopped in a state that the rate of increase in the current does not increase because the current value is saturated.

Figure 4:
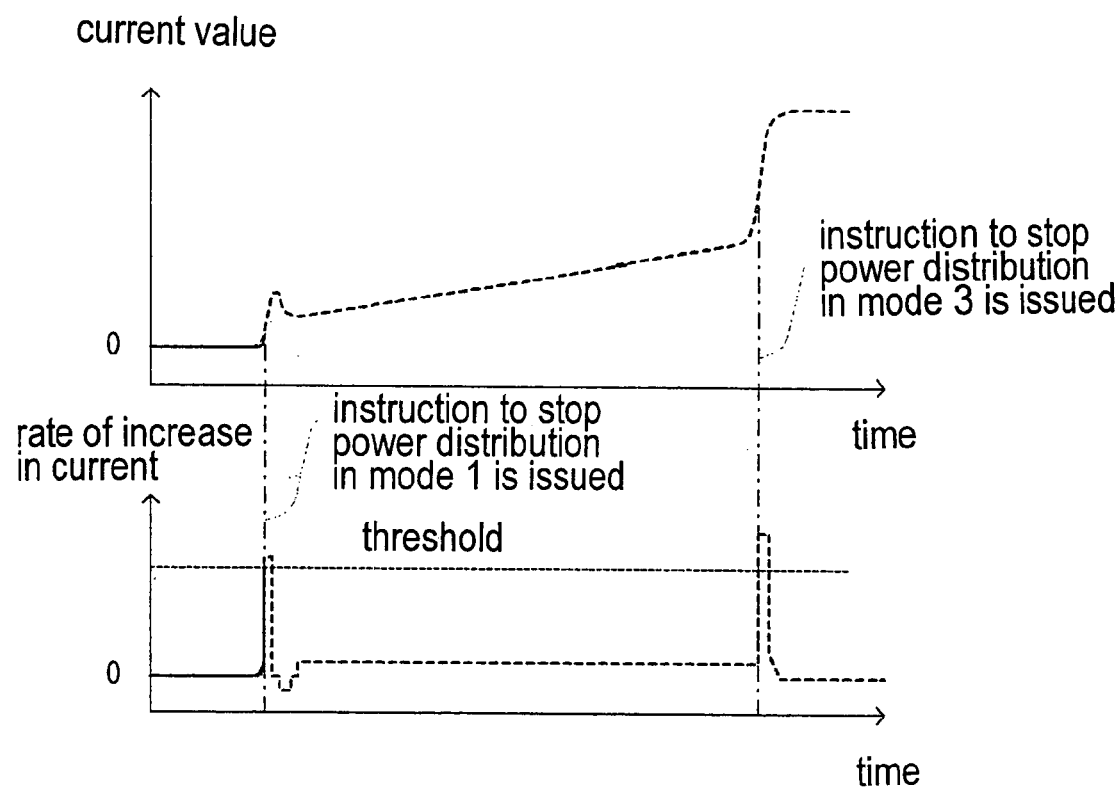
FIG. 4 is a chart showing a current and a rate of increase in the current with time for explaining a controlling method of Mode 3.

FIG. 4 is a chart for explaining the control in Mode 3. There may be a case that a large accelerated current is generated depending on the specification of the motor 5 when the motor 5 is turned on, so that the rate of increase in the current exceeds the predetermined threshold set in Mode 1 in an initial acceleration state shown in FIG. 4. In such a case, the power distribution to the motor 5 is stopped, thereby stopping the normal retracting operation. Therefore, in Mode 3, the control of the motor 5 is not executed during the initial driving stage of the motor 5, i.e. for a predetermined period (preferably slightly longer than the period until the acceleration is completed) from the moment when the power distribution to the motor 5 is started.

In Mode 1, the motor is driven only in the range indicated by the solid line shown in FIG. 4. In Mode 3, the power distribution to the motor 5 is stopped when the retraction proceeds and is completed as usual as shown by the hidden line, or a part of the occupant is caught in the seatbelt.

The disclosure of Japanese Patent Application No. 2003-322854 has been incorporated in the application.

While the invention has been explained with reference to the specific embodiments of the invention, the explanation is illustrative and the invention is limited only by the appended claims.

What is claimed is:

1. A method of controlling a seatbelt retracting device with a motor, comprising:
   supplying electricity to a motor for retracting a seatbelt,
   detecting the electricity flowing to the motor for retracting the seatbelt at a predetermined interval,
   calculating a difference with respect to a value read previously to find a rate of increase in the electricity,
   awaiting a predetermined period since the electricity is supplied to the motor, and
   starting to control the motor including stopping the motor when the rate of increase of the electricity exceeds a predetermined rate.

2. A method of controlling a seatbelt retracting device according to claim 1, wherein said stopping the motor is also made when the electricity flowing to the motor exceeds a predetermined value.

3. A method of controlling a seatbelt retracting device according to claim 1, wherein said electricity is current.

4. A method of controlling a seatbelt retracting device according to claim 1, wherein said motor is connected to the seat belt through a clutch, said motor and clutch being controlled by a control circuit.

5. A method of controlling a seatbelt retracting device according to claim 1, wherein said predetermined time since the electricity is supplied to the motor is a substantial period until an acceleration of the motor is completed.

* * * * *